United States Patent
Zaudtke et al.

(10) Patent No.: US 7,082,528 B2
(45) Date of Patent: Jul. 25, 2006

(54) ENABLING EMULATION OF SYSTEM FUNCTIONS BY AN EXTERNAL DEVICE

(75) Inventors: Stephen M. Zaudtke, Spring, TX (US); Andrew Brown, Houston, TX (US); Douglas R. Hascall, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 10/682,348

(22) Filed: Oct. 9, 2003

(65) Prior Publication Data
US 2004/0078503 A1    Apr. 22, 2004

Related U.S. Application Data

(63) Continuation of application No. 09/583,671, filed on May 31, 2000, now Pat. No. 6,654,816.

(51) Int. Cl.
*G06F 13/00* (2006.01)

(52) U.S. Cl. .............. 713/2; 713/300; 710/10; 275/462.15

(58) Field of Classification Search ........ 713/300–400, 713/1–2, 100; 710/1–5, 8, 14; 707/10, 102, 707/201; 341/176; 235/462.15, 472.01
See application file for complete search history.

(56) References Cited

U.S. PATENT DOCUMENTS

| | | | |
|---|---|---|---|
| 5,099,348 A | 3/1992 | Huddleston et al. | |
| 5,172,378 A * | 12/1992 | Sugioka et al. | 714/736 |
| 5,265,238 A | 11/1993 | Canova et al. | |
| 5,333,308 A * | 7/1994 | Ananthanpillai | 714/4 |
| 5,519,832 A | 5/1996 | Warchol | |
| 5,730,602 A * | 3/1998 | Gierhart et al. | 434/155 |
| 5,768,598 A * | 6/1998 | Marisetty et al. | 710/260 |
| 5,850,187 A | 12/1998 | Carrender et al. | |
| 5,870,541 A * | 2/1999 | Tamura | 714/47 |
| 5,875,293 A | 2/1999 | Bell et al. | |
| 5,919,248 A * | 7/1999 | Kahkoska et al. | 709/224 |
| 6,049,792 A | 4/2000 | Hart et al. | |
| 6,081,856 A * | 6/2000 | Comer | 710/67 |
| 6,098,120 A * | 8/2000 | Yaotani | 710/16 |
| 6,131,130 A * | 10/2000 | Van Ryzin | 710/6 |
| 6,167,464 A * | 12/2000 | Kretschmann | 710/15 |
| 6,195,712 B1 * | 2/2001 | Pawlowski et al. | 710/19 |
| 6,252,511 B1 | 6/2001 | Mondshine et al. | |
| 6,289,213 B1 * | 9/2001 | Flint et al. | 455/420 |
| 6,304,982 B1 * | 10/2001 | Mongan et al. | 714/38 |
| 6,438,711 B1 * | 8/2002 | Woodruff | 714/27 |
| 6,468,223 B1 | 10/2002 | Kaga | |
| 6,493,782 B1 | 12/2002 | Verdun et al. | |
| 6,522,242 B1 | 2/2003 | Barrus et al. | |
| 6,558,320 B1 * | 5/2003 | Causey et al. | 600/300 |
| 6,601,129 B1 * | 7/2003 | Arakeri et al. | 710/316 |
| 6,618,774 B1 * | 9/2003 | Dickens et al. | 710/64 |
| 6,654,816 B1 | 11/2003 | Zaudtke et al. | |
| 6,714,990 B1 * | 3/2004 | Autio et al. | 709/250 |
| 6,735,663 B1 | 5/2004 | Watts et al. | |
| 6,807,629 B1 | 10/2004 | Billick et al. | |
| 6,842,861 B1 * | 1/2005 | Cox et al. | 713/188 |
| 6,868,375 B1 | 3/2005 | Margulieux | |
| 2002/0026571 A1 * | 2/2002 | Rickey | 713/2 |
| 2002/0029295 A1 * | 3/2002 | Tognazzini | 709/253 |
| 2003/0088160 A1 * | 5/2003 | Halleck et al. | 600/300 |
| 2004/0048503 A1 * | 3/2004 | Mills et al. | 439/76.1 |

\* cited by examiner

Primary Examiner—Christopher Shin (57) ABSTRACT

A system includes an interface to communicate with a handheld device, and a processor to interact with the handheld device through the interface to enable the handheld device to emulate a pointer device function and a display function of the system.

23 Claims, 9 Drawing Sheets

ENABLING EMULATION OF SYSTEM FUNCTIONS BY AN EXTERNAL DEVICE

CROSS REFERENCE TO RELATED APPLICATIONS

This is a divisional of U.S. Ser. No. 09/583,671, filed May 31, 2000, now U.S. Pat. No. 6,654,816 which is hereby incorporated by reference.

FIELD OF THE INVENTION

The present invention relates to computer management and diagnostics, and more particularly to a system and method for retrieving, displaying and controlling information of a computer by a handheld or portable device or the like via a communication interface.

DESCRIPTION OF THE RELATED ART

It is often desired or even necessary to monitor certain parameters of a computer system to determine its status or to identify certain error conditions. This is particularly true for a server on a network. System administrators of a network, for example, must typically monitor the operation of one or more computers operating as servers of the network to determine and identify critical errors and operating parameters. One or more server systems are typically coupled to a local area network (LAN) or wide area network (WAN) or the like to serve a corresponding plurality of client computer systems. In more sophisticated configurations, the servers are equipped with management capabilities or software to enable a system administrator to control operations of the network, track, and monitor network status, to maximize network efficiency, and to locate and correct network problems or failures. Many network management systems software is based on the simple network management protocol (SNMP) which is a well known management standard. Some particular network management software includes Compaq's companion insight manager (CIM) or Novel's netware.

Other information is also useful for performing management functions, such as the usage of resources and the status of various hardware devices installed. For example, it may be desired to determine the amount of available memory, parameters associated with the CPU(s), the version and date of ROM firmware, etc. A system monitoring software application may be used to monitor and identify such information for display on a monitor. For larger networks with several servers, it is not always convenient or cost effective to have a monitor for each system, or even to supply a single common monitor. For example, for network configurations including one or more servers mounted on a rack, there may be insufficient room for a monitor and other peripheral devices such as a mouse and keyboard.

In the simplest form, server diagnostics may consist of a system light emitting diode (LED) display indicating normal operation, activity, or some sort of system warning or failure. The LED design provides limited Input/Output (I/O) capability, is awkward to use, and provides limited capability, as only a particular subset of management information is available due in part to limited display capability. More advanced diagnostic features are available using Liquid Crystal Displays (LCDs) in order to provide additional and more complete information. The LCD usage model is usually one of alert or exception reporting. During normal operation, the LCD display is under-utilized. It displays nametag information, or other static information. The LCD is most beneficial during fault conditions or for asset management. The display has the ability to notify the user of a fault condition, and to provide additional easily accessible detail regarding the condition, possible precursor events, and appropriate resolution measures. It should be noted that there are other display technologies that provide similar functionality such as vacuum fluorescent technology.

One particular LCD device is an Integrated Management Display (IMD), which provides a more complete set of management information to the administrator. An existing IMD is relatively expensive and consumes a large amount of real estate on the front bezel. The case of the IMD is excessively large for the new dense server designs, and cannot be included on some designs. For example, cooling requirements may often preclude the use of a large diagnostic display that consumes a substantial amount of front bezel space. It is possible to reduce the size and capabilities of the IMD, but reducing functional capabilities is not always desired or practicable.

There is a concern regarding the implementation of many LCD displays in a server. As the density of the servers and other products continually increases, there will be more and more LCD displays in rack configurations. A configuration with a substantial number of displays are often utilized only in the exception case, such as when indicating the need for attention during fault conditions, and thus are often under-utilized during normal operations.

Even with the cost of LCD designs being reduced to address cost concerns, LCD devices are likely to be sold as options for certain configurations. It is expected that as the option cost decreases, attach rate will increase. It is desired to reduce the cost to provide management capabilities on a greater number of devices.

SUMMARY OF THE INVENTION

A communication interface system according to embodiments of the present invention may have many forms depending upon the desired functionality, such as status information retrieval, computer diagnostics, computer interface, etc. In some embodiments, a communication interface system enables retrieval of status or health information of a computer by a handheld device. In more sophisticated embodiments, the handheld device may be utilized to interact and control the computer system at various levels of operation, including power up, normal operation and powered down states.

A computer status information retrieval system, according to an embodiment of the present invention, includes a computer and a handheld device each with a communication port. The computer executes a health program that provides status information associated with operation of the computer. The handheld device interfaces with the computer communication port to retrieve and display the status information. The computer status information retrieval system is particularly advantageous when the computer is in a headless configuration, where the computer does not otherwise have input/output (I/O) devices such as a keyboard, mouse, or monitor. In the headless configuration, the computer communication port is conveniently located on the front bezel of the computer, where the handheld device replaces the LCD hardware the retrieve the status information. The handheld device may be any type of portable device including a corresponding serial or infrared communication port, such as a palm PC (PPC) a personal digital assistant (PDA), a notebook computer, etc.

It is appreciated that a single communication port is relatively small compared to IMD or LCD hardware so that valuable real estate on the front bezel of the computer is saved. This is particularly advantageous for a server system in a stacked configuration, where each server has only a single communication port for communication with an external device, such as a handheld PDA. An administrator can communicate with any of the server systems in the stack configuration via the communication port via the handheld device, which conveniently replaces IMD or LCD functions.

In one embodiment, the communication between the computer and handheld device is through serial ports. In serial port embodiments, a serial cable is coupled between the serial ports of the handheld device and the computer. In one embodiment, a docking cradle with a serial connector is provided where the handheld device is placed into the docking cradle to enable serial communications with the computer.

It is noted that the status information may include any information that is collected, stored or otherwise provided by a health program executing on the computer system. Such health information may at least include any combination of naming information, system hardware information or event information. The handheld device may be utilized to simply retrieve the health information from the computer. In another embodiment, the health program is capable of controlling operational parameters of the computer, where the handheld device assumes operational control of the computer via the health program. In a further embodiment, the computer is a server coupled to a network and executes network management software that monitors management information in that controlled parameters associated with a network. In this manner, the handheld device may retrieve status information of the network and may further have control of management functions via the network management software. In any of the embodiments, the handheld device may include a browser application to conveniently browse any of the status of health information of the computer. The handheld device typically has a display, where the browser displays the information on the handheld device for use by an administrator.

And yet further embodiments, the communication ports of the handheld device and the computer are implemented with infrared transceivers. In this manner, the handheld device communicates with the computer via an infrared protocol such as the IrDA protocol. In one embodiment for example, the computer includes a peripheral bus, such as a peripheral component interconnect (PCI) bus, and further includes a management function system coupled to the peripheral bus. The management system is coupled to an I/O bus, which is further coupled to a microcontroller. The microcontroller is coupled to an infrared transceiver, which may conveniently be located on the front bezel of the computer. In this manner, the microcontroller may implement an IrDA stack for enabling communications with the handheld device via the infrared transceiver. The I/O bus may be implemented in any suitable format, such as the I²C bus by Philips Electronics.

In yet further embodiments, a memory, such as implemented using non-volatile (NV) memory devices or the like, may be coupled to the microcontroller for storing the status information of the computer. The microcontroller may then store status information from the computer into its NV memory, or may further store information from the handheld device sent via the infrared transceiver. In yet another embodiment, the computer infrared transceiver, the microcontroller and the NV memory receive auxiliary power so that these devices are operational when the computer is powered down. In this manner, the microcontroller sends information from the NV memory to the handheld device even when the computer is powered down.

A computer diagnostic system according to an embodiment of the present invention includes a computer with a communication port, an I/O system and a handheld device. The computer and communication port are implemented in a similar manner as previously described. The I/O system enables communication via the computer communication port during power up self test (POST) of the computer system. The handheld device communicates with the computer during POST. In one embodiment, the I/O system includes a System ROM that further includes I/O code to enable communications with the handheld device when executed. The main processor or CPU of the computer executes the I/O code during POST upon power up of the computer. For example, the basic input/output system (BIOS) stored in the System ROM of the computer is typically transferred to main memory and executed by the main processor. The processor executes the I/O code to enable the handheld device during POST so that the handheld device replaces some of the standard I/O devices during power up.

For example, the I/O code may enable the handheld device to emulate at least one I/O device, such as any one or more of a keyboard, a mouse, a disk drive, a monitor etc. In this manner, any information that might otherwise be displayed on a monitor coupled to the computer is forwarded to the handheld device for display. Furthermore, an administrator may interface the computer via the handheld device to perform set up or configuration or any other diagnostics for the computer during power up and before the operating system is installed and executed.

The computer diagnostic system is implemented in a similar manner as previously described, such as through serial or infrared communications. For the infrared communication embodiments, the computer includes an infrared transceiver, an I/O bus, a microcontroller and memory. This enables infrared communications with the handheld device, which also includes an infrared transceiver and infrared communication capabilities. Further, the infrared system may receive auxiliary power to enable communications with the handheld device even while the computer is powered down.

A computer interface system for a computer according to an embodiment of the present invention includes a CPU, a peripheral bus, a management processor coupled to the peripheral bus and an infrared transceiver coupled to the management processor. In this embodiment, the management processor enables an external device to emulate any one or more of a keyboard, a mouse, a disk drive, a floppy disk drive, a CD-ROM drive, and a monitor via the infrared transceiver of the computer. The management processor may operate in a similar manner as the microcontroller previously described. For example, the management processor may implement an IrDA stack and conduct the infrared communications via the infrared transceiver. Alternatively, a microcontroller and memory may be coupled to the management processor via an I/O bus, such as the I²C bus. The microcontroller may then be utilized to implement the IrDA stack to enable communications with the external device via the infrared transceiver.

The management processor may perform additional functionality as compared to a microcontroller only embodiment. For example, the management processor may decode video cycles on the peripheral bus, convert the video cycles to a video stream, and send the video stream via the infrared transceiver for display by the external device. The management processor may further include a memory, such as implemented using RAM and ROM devices, where the management processor stores status information of the computer into its memory. The management processor and its memory may also be powered through auxiliary power so that it is functional when the power of the computer is shut down. In this manner, the external device may communicate with the management processor and retrieve status information of the computer even while powered down. The management processor may be implemented to monitor the system health during normal operation and further may track events that lead to a shutdown of the computer system. Since the management processor operates through the shut down process and continues to operate after shut down, an administrator may retrieve vital shut down or other event information from the management processor memory at any time. The administrator will be able to use functionality of the management processor in order to power on the computer system.

It is appreciated that a communication interface system according to embodiments of the present invention completely replaces prior IMD or LCD configurations. The computer need only include an external communications port, such as a serial or infrared transceiver port, to enable communications with and external, handheld device. The handheld device replaces an IMD or LCD for any number of computers, such as server computers in a stacked configuration. A communication interface system may provide additional control, configuration, or setup functionality depending upon the particular embodiment.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF
EMBODIMENT(S) OF THE INVENTION

Figure 1:
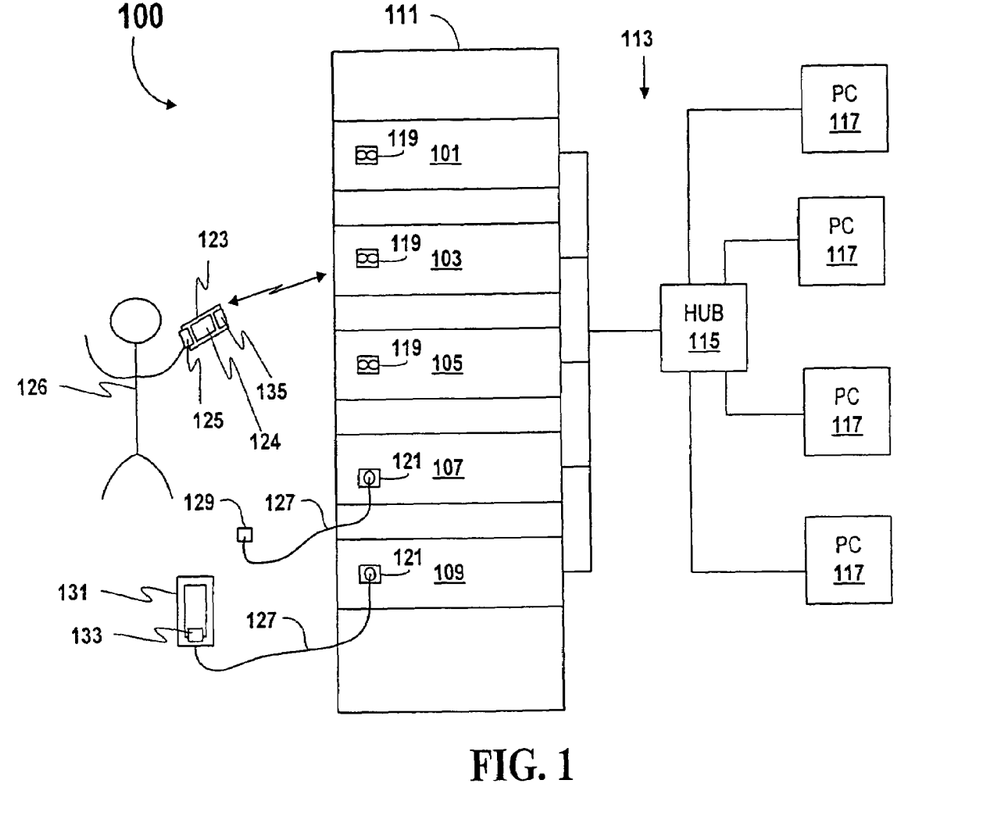
FIG. 1 is a simplified block diagram of an exemplary network system that is used to illustrate a communication interface system according to an embodiment of the present invention.

FIG. 1 is a simplified block diagram of an exemplary network system 100 that is used to illustrate a communication interface system according to an embodiment of the present invention. Although the communication interface system is useful and illustrated in a network configuration, it is understood that the present invention is not limited to network configurations and may be utilized in any type of computer system, including a standalone computer system. One or more server computers 101, 103, 105, 107, 109, etc. are coupled to a network 113, such as a local area network (LAN) or the like, for servicing one or more computer systems (PCs) 117. In the embodiment shown, the network 113 is implemented with a HUB 115, such as a repeater or switch device or the like, that is coupled to each server computer 101–109 and to each of the PCs 117 in a star configuration. Each of the server computers 101–109 and the PCs 117 include an appropriate network card or NIC or the like (not shown) for enabling network communications. The network 113 may be implemented according to any desired architecture, such as Ethernet or the like, and may use any desired network protocol. The server computers 101–109 are implemented for a rack configuration and are shown mounted in a rack 111.

A user or administrator 126 desires to determine the status of the network 113 or any device on the network 113, including the HUB 115, any of the PCs 117 or any of the server computers 101–109. Any one or more of the server computers 101–109 may include management software or the like that stores network management information. The administrator 126 may further desire to determine the health status of each of the server computers 101–109. Each of the server computers 101–109 includes health software that stores and reports health information of the respective computer. Computer monitoring software or the like executed on the respective server computer 101–109 continuously monitors parameters and information measured by hardware detection devices (not shown) indicative of the status or "health" of the computer. Such parameters may include temperature level(s), vital voltage and current levels, etc., and the other important information may include data related to status of cooling fan(s), status of batteries, non-maskable interrupts (NMIs), PCI bus parity errors, etc. Other information and data is also monitored, such as, for example, parameters associated with one or more processor(s) or CPUs, amount of total memory, ROM date, phone numbers of support personnel, etc. This information along with other information is collectively referred to as the management and status information as further described below.

IMD devices were previously used to operate in conjunction with the computer monitoring software to access the system status information. Each IMD device operated according to a menu system with a menu map that was navigated by the administrator 126 via an onboard keypad or the like to access and display the desired system status information on an LCD screen or the like. These IMD devices are required for each computer system within this person's usage model.

As shown, the administrator 126 instead carries a portable or handheld device 123 or the like for accessing management and/or health information. The handheld device 123 may comprise any type of portable device, palm device (e.g., the Palm PC or PPC), handheld device, notebook computer, or any type of personal digital assistant (PDA) device or the like, such as the Palm Pilot by 3COM, etc. The handheld device 123 includes any associated operating system, such as Windows CE or the like. In one embodiment, the handheld device 123 includes an appropriate LCD display 124 and communicator and browser software for accessing and displaying the desired management and status information. Each of the server computers 101–109 includes an I/O port that interfaces with the handheld device 123 to enable communication with each of the server computers 101–109. In some embodiments, the server computers 107 and 109 include serial ports 121 that couple via appropriate connectors to a serial cable 127 or the like. The serial ports 121 may be located anywhere on the server computers, such as the front bezel for convenient access by the administrator 126. In one embodiment, the serial cable 127 couples to a docking cradle 131 for receiving and docking the handheld device 123. The docking cradle 131 includes an appropriate connector 133 that interfaces a corresponding serial connector 127 of the handheld device 123 to enable communications when docked. In another embodiment, the serial cable 127 includes an appropriate connector 129 that is connected directly to the connector 125 of the handheld device 123 to enable communications.

The serial cable embodiments, with or without the docking cradle 131, enable relatively convenient access and control of the coupled server computer 107, 109. The serial ports 121 may be conveniently located and are relatively small and thus do not consume appreciable real estate on the front bezel of the server computers 107, 109. The serial cable 127 must be available and connected to the respective server computer, however, before communications are initiated.

In another alternative embodiment, the server computers 101–105 each include an infrared (IR) transceiver 119 located at any convenient location, such as the front bezel in a similar manner as the serial port. The infrared transceivers 119 enable communication via an infrared transceiver 135 provided on the PDA device 123. In the infrared transceiver embodiment, the administrator 126 need only point the handheld device 123 in the general direction of one of the infrared transceivers 119 to establish, initiate and maintain communication, or otherwise conduct a communication session, with any of the server computers 101–109. Like the serial ports 121, each infrared transceiver 119 is conveniently located and is relatively small so that it does not consume appreciable real estate, such as on the front bezel of the server computers 101–105. Any of the server computers 101–109 may be equipped with either or both of the serial ports 121 or infrared transceivers 121, although only one type of I/O port would typically be selected for a particular configuration.

In one embodiment, the handheld device 123 replaces an IMD or LCD display or the like for determining the health of one or more of the server computers 101–169 or the status and/or configuration of the network 113. Such functions may be performed by communicating with one of the server computers 101–109 while powered on with its operating system (OS) in full operation. In an alternative embodiment, the server computer includes an auxiliary power source that provides power to a memory and the communication devices to enable limited access of information while the system is powered down. In this manner, any information stored in the memory, such as the most recent status information of the server, is accessible at any time. It is further noted that any other smart or intelligent devices that are coupled to auxiliary power may provide further information during the power down state. For example, a thermistor or thermometer or the like may be queried after system shut down to provide temperature information that may lead to discovery of the cause of the shut down.

In a more sophisticated embodiment, a processor or the like is coupled to auxiliary power to provide certain information when powered down, such as system name or identification, status and configuration. The processor may further be used to alter or change system configuration information that is utilized at next boot up of the computer.

In yet another embodiment, the handheld device 123 may be used as the primary I/O interface during system power up before the OS is installed and executed. For example, the system ROM includes a Basic Input Output System (BIOS) routine that further performs Power On Self Test (POST) for the computer system. The POST routine is a series of diagnostic tests to ensure that the basic hardware is operating properly. The BIOS also initializes basic hardware and I/O operations, such as communication with disk drives, a keyboard, basic video functions, etc. In a first embodiment, the BIOS routine includes code to enable communications with the handheld device 123 during power up, so that the handheld device 123 can perform or otherwise replace certain I/O functions. For example, the handheld device 123 is enabled to perform any one or more I/O functions, including mouse, keyboard, video, disk operations, etc. In this manner, the administrator 126 monitors and controls the computer system during power up. Anything that would normally be displayed on a monitor is instead displayed on the display 124 of the handheld device 123. In this manner, the administrator 126 is able to monitor system status during power up and receive any reports or error messages that may be displayed. Furthermore, the administrator 126 is able to use the handheld device 123 to run configuration for the computer, or to run any diagnostic software or routines to determine system status and identify any problems, etc.

Figure 2:
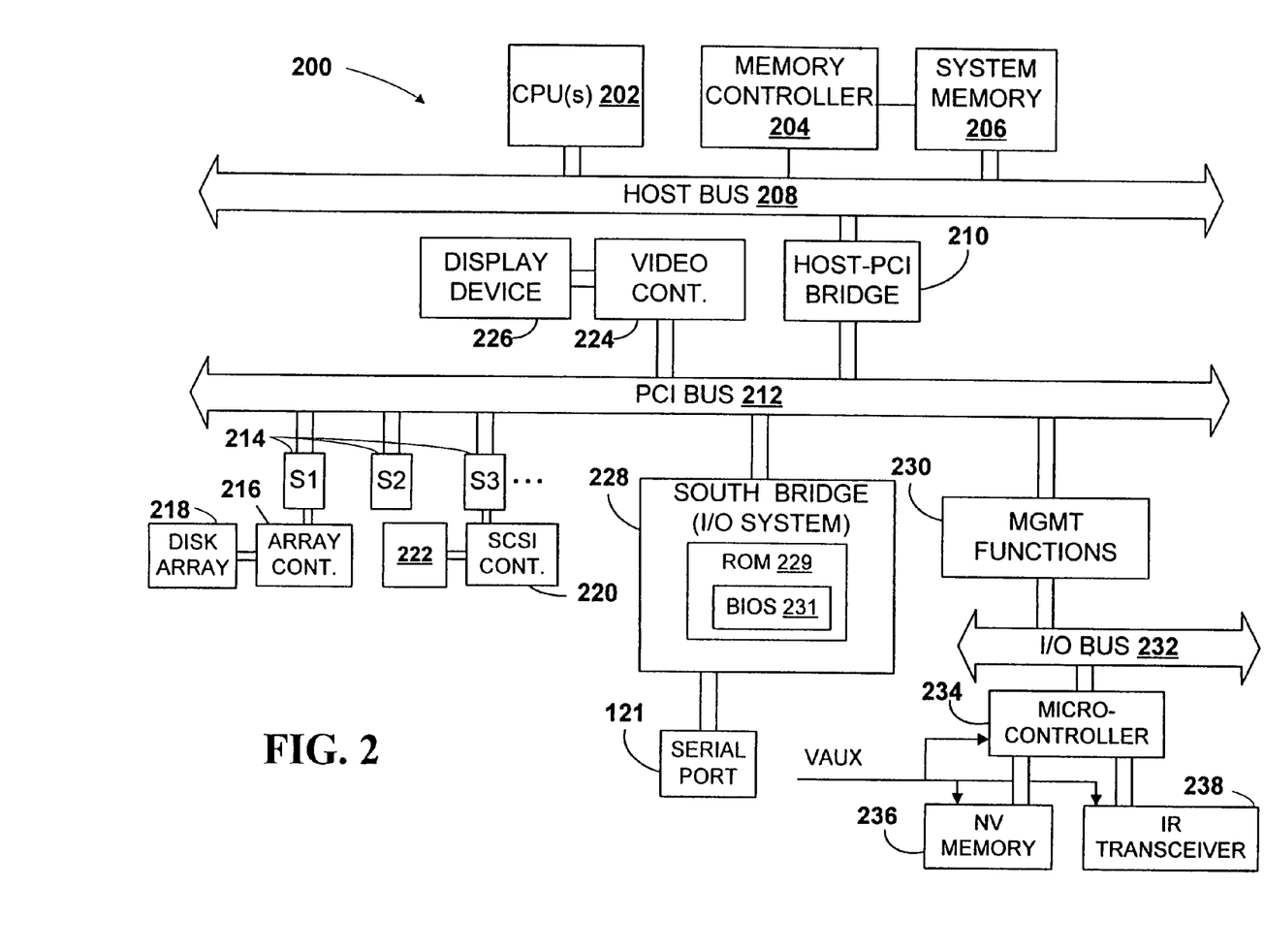
FIG. 2 is an exemplary system block diagram of any of the server computers of FIG. 1.

Referring now to FIG. 2, an exemplary system block diagram is shown of a server computer 200, which represents an embodiment of any of the server computers 101–109. The server computer 200 is an industry standard compatible, high-end personal computer (PC) system or the like typically used for workstations or server systems, although any type of desktop, portable or laptop computer is also contemplated. Although the present invention is illustrated using an industry standard compatible computer system, it is understood that the present invention is applicable to other types of computer systems as known to those skilled in the art. The server computer 200 includes a host bus 208, which is coupled to one or more central processing units (CPUs) 202. Only one CPU 202 is shown, though it is understood that a multiprocessor computer system is also contemplated. The CPU 202 may include an appropriate processor and supporting circuitry, such as the 80486, Pentium™, or Pentium II™, Pentium III™, etc. microprocessors from Intel Corp., although other types of processors are contemplated, such as the K6 line of microprocessors by Advanced Micro Devices, Inc. (AMD). The external circuitry preferably includes an external or level two (L2) cache or the like (not shown). A memory controller 204 is coupled to the host bus 208 for interfacing system memory 206. The system memory 206 is preferably implemented with one or more memory boards plugged into compatible memory slots on the motherboard of the server computer 200.

The server computer 200 may include one or more peripheral, expansion, input/output (I/O) buses, etc. as desired. For example, the exemplary configuration includes a PCI bus 212 coupled to the host bus 208 via a Host-PCI bridge 210. The PCI bus 212 is typically implemented with one or more PCI slots 214 individually labeled S1, S2, S3, and so on. Each of the PCI slots 214 are configured to receive compatible PCI adapter cards incorporating one or more PCI devices as known to those skilled in the art. Typical PCI devices include network interface cards (NICs), disk controllers such as a SCSI (small computer systems interface) disk controller, video or graphics controllers, etc. In the exemplary configuration shown, for example, an array controller 216 is plugged into the slot S1 for coupling a disk array 218 of hard disk drives. Another SCSI controller 220 is shown plugged into the slot S3 for coupling a cache disk drive 222. One or more integrated PCI devices may also be included, which are typically integrated onto the motherboard itself and coupled directly to the primary PCI bus 212. In the exemplary configuration shown, for example, an integrated video controller 224 may be coupled to the PCI bus 212 for coupling to a display device 226, such as a monitor or any other type of output visual device for computer systems.

The server computer 200 includes a south bridge I/O system 228 coupled to the PCI bus 212. The south bridge I/O system 228 incorporates many of the traditional I/O controllers and devices, such as serial and parallel communication ports, a system read only memory (ROM) 229 comprising one or more ROM modules, one or more disk controllers (such as a floppy disk controller and/or a hard disk controller for coupling corresponding floppy or hard disk drives, a keyboard controller for coupling a keyboard, a real time clock (RTC) and timers, a mouse controller for coupling a mouse, as well as other peripherals, such as a direct memory access (DMA) system, diagnostics ports, command/status registers, battery-backed CMOS memory, etc. The serial port 121, for example, is provided on or otherwise through the south bridge I/O system 228. The system ROM 229 typically includes a BIOS routine 231 that further performs POST for the server computer 200.

The server computer 200 further includes a management functions system 230 coupled to the PCI bus 212. The management functions system 230 may include several system level devices or components (not shown), such as one or more APICs (advanced programmable interrupt controllers) or non-volatile static random access memory NVSRAM) or the like. The management functions system 230 couples to a secondary I/O bus 232, which is further coupled to a microcontroller 234. In one embodiment, the secondary I/O bus 232 is implemented as an I²C bus by Philips Electronics. The microcontroller 234 is any suitable microprocessor or controller, such as the Scenix 48/52 microcontroller by Scenix Semiconductor, Inc. The microcontroller 234 is further coupled to a non-volatile (NV) memory device 236 and to an infrared (IR) transceiver 238. In one embodiment, the microcontroller 234, NV memory device 236 and the IR transceiver 238 are powered only while the main server computer 200 is powered up. Alternatively, an auxiliary power source (not shown) of the server computer 200 provides an auxiliary power signal (VAUX) to the microcontroller 234, the NV memory device 236 and the IR transceiver 238, so that these devices are powered and available for communication while the server computer 101 is powered down.

Figure 3A:
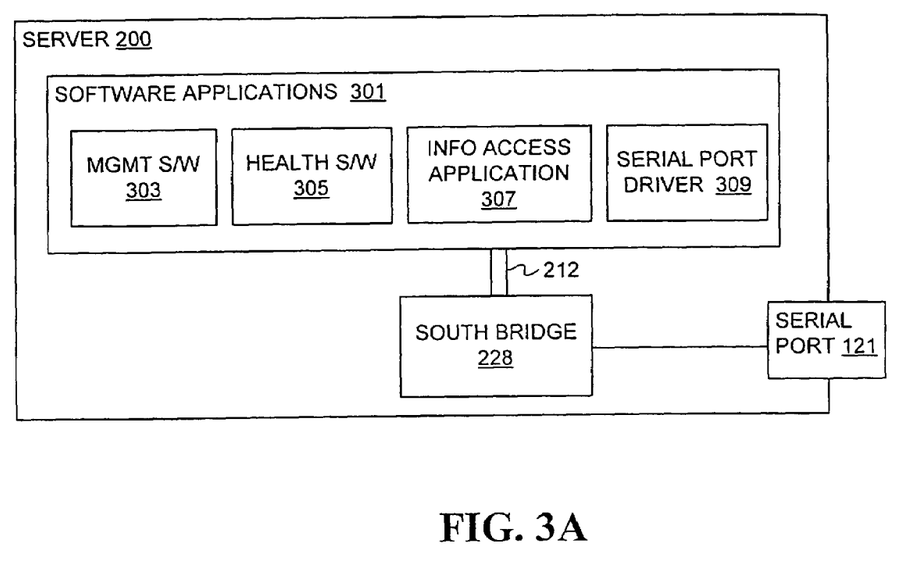
FIG. 3A is a simplified block diagram of the exemplary server computer illustrating an exemplary interface between the software and hardware components of a communication interface system according to a serial port embodiment.

FIG. 3A is a simplified block diagram of a server computer 200 illustrating an exemplary communication interface between the software and hardware components of a communication interface system according to an serial port embodiment of the invention. Again, the server computer 200 is an exemplary embodiment of any of the server computers 101–109. Software programs or applications 301 are loaded into the system memory 206 for execution by the CPU(s) 202. The software applications 301 includes management software 303, health software 305, an information access application 307 and one or more drivers, such as serial port driver 309 for enabling communication with the serial port 121.

In one embodiment, the health software 305 runs in conjunction with operating system and hardware devices to continuously monitor the health and status of the server computer 200. For example, the health software 305 continuously monitors the status and "health" of the server computer 200 by monitoring parameters such as temperature level(s), vital voltage and current levels, etc. and further monitors other important status and error information, such as information related to status of cooling fan(s), status of batteries, non-maskable interrupts (NMIs), PCI bus parity errors, etc. Other system information is also accessible for display, such as, for example, numbers associated with the CPU, amount of total and available memory, ROM date, phone numbers of support personnel, etc. In a similar manner, the management software 303, if installed, runs in conjunction with operating system and the network 113 to continuously monitor the health and status of the of the network 113. This error, management and status information along with other information available for display is collectively referred to as management and status information associated with the server computers 101–109, or the PCs 117 or the network 113 or any combination thereof.

The management software 303 and the health software 305 may further be used to control characteristics, attributes, parameters, operating values, etc. associated with the server 200 or the network 113, including the other server computers 101–109, the HUB 115, the PCs 117, etc. For example, in the event that the health software 305 reports an excessive heat condition within the server computer 200, may increase the speed of one or more fans to control the heat. The health software 305 may further report an operating problem or error of a device or component, such as the CPU(s) 202, in which case the administrator 126 may desire to shut the server computer 200 down to replace the malfunctioning device(s). Of course, the health software 305 may perform some of these functions automatically. The management software 303 may be used in a similar manner, such as, for example, to control the operating status of one or more ports of the HUB 115.

The information access application 307 interfaces with the management software 303 and the health software 305 to enable communications with an external device via the serial port 121, such as with the handheld device 123. In this manner, the administrator 126 has access to any of the management and status information provided by the management software 303 and the health software 305 via the handheld device 123 coupled through the serial port 121.

Figure 3B:
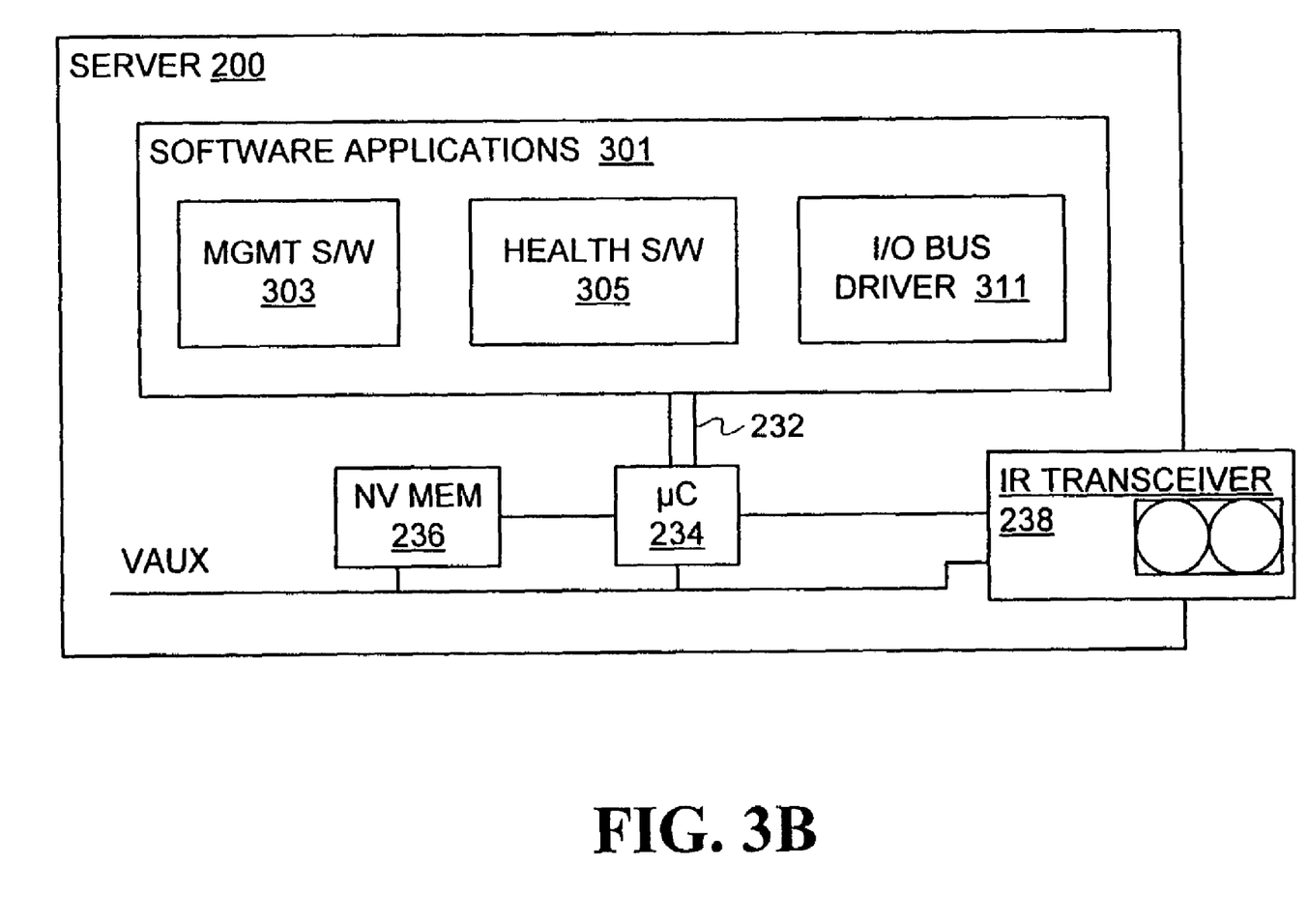
FIG. 3B is a simplified block diagram of the exemplary server computer illustrating an exemplary interface between the software and hardware components of a communication interface system according to an infrared transceiver embodiment.

FIG. 3B is a simplified block diagram of the server computer 200 illustrating an exemplary interface between the software and hardware components of a communication interface system according to an infrared transceiver embodiment of the invention. Again, the server computer 200 is an exemplary embodiment of any of the server computers 101–109. As before, the software applications 301 includes the management software 303, the health software 305, and one or more drivers. In this case, the drivers include as an I/O bus driver 311 for enabling communication with the I/O bus 232. For an I²C bus, the bus driver 307 is correspondingly implemented as an I²C bus driver. The I/O bus 232 is shown coupled to the microcontroller 234, which is further coupled to the NV memory 236 and the IR transceiver 238. Other support circuitry is not shown but is provided as necessary, such as discrete components and clock circuitry with appropriate oscillator or the like.

The Infrared Data Association (IrDA) is the governing body that promotes the IrDA protocol and its interfaces. This group is primarily concerned with ensuring compliance to the IrDA standard, to ensure compatibility between devices, and promoting the use of infrared as a communications standard. The IrDA protocol is widely used; laptops, handheld devices, palm devices, Palm Pilots, notebooks, digital cameras, and other devices may be implemented to use IrDA as a wireless communications mechanism. Additionally, other infrared technologies exist for the consumer market addressing different needs, such as stereo and TV remote controls. Infrared technology is a safe and well-proven communications strategy for near distance line-of-sight communications. The IrDA standard serial type emulation with the IrCOMM protocol, and more advanced application protocols that allow socket level access to the data stream. With IrCOMM protocols, PPP (Point-to-Point Protocol) and TCP/IP (Transmission Control Protocol/Internet Protocol) support can be easily implemented.

Infrared devices capable of communicating with standard devices may be implemented according to the IrDA protocol. The IrDA protocol consists of both a physical layer specification and logical layer specification. The physical layer is addressed with an infrared transceiver. The infrared transceiver 238, for example, comprises a transmitter/receiver pair, which provides access to the physical medium using infrared light at approximately the 980 nano-meter (nm) wavelength. An encoder/decoder (ENDEC) component is typically used to convert the pulses on the physical medium to pulses compatible with UART (Universal Asynchronous Receiver Transmitter) or other signal mechanisms. The remaining portion of the IrDA protocol that manages the access protocol, collisions, data integrity, and higher level communication interfaces is implemented in software.

IrDA stack implementations are available that require processing power sufficient to operate UART style communications, and that provide a suitable operating environment for the IrDA stack. Appropriate systems might be the host operating system, or embedded processors. Both of these solutions may be utilized but have various disadvantages. For example, in some embodiments it is desired to operate whether or not the host operating system is present and/or functioning correctly. In the server computers 101–109, for example, it is desired to enable embodiments in which infrared communications occur while the respective server computer is powered down. Minimizing the interaction between a host operating system and diagnostic capabilities is desired to eliminate possible disruptions. The use of embedded processors is contemplated. Embedded processor solutions, however, may be relatively expensive to implement solely for the purpose of IrDA communications. The requirements for physical, power, board space, and software implementation may be costly.

An embodiment utilizing the microcontroller 234 enables the functionality of the IrDA stack without significant cost. The microcontroller 234 is implemented to drive an IR transceiver 238 to communicate with the IR medium. Additionally, the microcontroller 234 includes the processing capabilities to perform the ENDEC function without an external ASIC (Application Specific Integrated Circuit).

The I/O bus 232 and I/O bus driver 307 enable communication between the microcontroller 234 and any software applications on the server computer 200, such as the management software 303 and the health software 305. The microcontroller 234 enables infrared communications with external devices, such as the PDA 123, via the IR transceiver 238. An optional LCD display could be provided along with LEDs and buttons or the like, where the NV memory 236 is used as LCD storage for menus and alerts. The microcontroller 234 handles buttons, LEDS, LCD updates, and timers to minimize host requirements. In one alternative embodiment, the IR transceiver 238 is the sole I/O device, and the microcontroller 234 repeatedly broadcasts existing LCD information from the NV memory 236. Any appropriate listening device, such as the handheld device 123, can receive and display the broadcasted information. In another alternative embodiment, the IR transceiver 238 is again the sole I/O device, but the NV memory 236 is populated with data from the host system through the I²C bus. In this embodiment, the microcontroller 234 manages the IR transceiver 238, ENDEC logic, and the IrDA protocol to receive requests. Response data is obtained from the NV memory 236, and the response is sent back by the microcontroller 234 out the IR transceiver 238. In these embodiments utilizing the I²C bus, the microcontroller 234 operates as an I²C bus slave.

The management status information is accessed by the microcontroller 234 and transmitted via the IR transceiver 238 to an external device, such as the handheld device 123. Alternatively or in addition, the management status information is written to the NV memory 236 by the microcontroller 234. When queried by the handheld device 123, the microcontroller 234 transmits the information stored in the NV memory 236 via the IR transceiver 238 to the handheld device 123, which displays the information on its display 124. The auxiliary power providing power via the VAUX signal enables the handheld device 123 to retrieve information from the NV memory 236 even when the main power of the server computer 200 is shut down. The microcontroller 234 receives queries from the handheld device 123 and forwards requested information from the NV memory 236 at any time. The administrator 126 may further submit commands to the management software 303 and/or the health software 305 via the handheld device 123, which commands are received by the IR transceiver 238 and forwarded by the microcontroller 234 to the appropriate software application 301.

In one embodiment, the microcontroller 234 is implemented with the appropriate code to transmit information, files or data in a form that can be browsed and displayed by the handheld device 123. In one embodiment, the capabilities of the handheld device 123, such as a 3COM Palm Pilot or a Windows CE device, are used in order to represent the data of an LCD device. The administrator 126 obtains the LCD information using the handheld device 123. The software available on the handheld device 123 improves the usability of the information presented. In particular, font size and font color can be controlled, LED icons may be customized to suit user preferences, the data can be easily stored, and moved to locations where support services are more readily available. This embodiment fosters additional capabilities in asset management and inventory control. For the infrared embodiments, the information presented by the server computer 200 becomes a unique invisible IR barcode.

A more advanced solution takes full advantage of the display technologies used in mobile devices. Graphical, sound, and color capabilities that are not feasibly implemented by the server computers 101–109 are implemented efficiently by leveraging the functionality of the handheld device 123, where the information is communicating via infrared technology.

Various web pages and information pertaining to the state of the server computer 200 or the network 113 may be provided on the server computer 200. For example, the NV memory 236 may be populated with such web pages and information. Diagrams indicating replacement components, FRU codes, color, sounds, and the many features available from the web browser experience are transmitted to the handheld device 123. Agents that leverage HTML (Hyper-Text Markup Language) documents and web browser technologies also provide this information. A subset of the full CIM/XE information may be desired in order to provide the best web content that is viewable by a mobile device, such as the handheld device 123. As functionality and capabilities increase, the content is also increased to provide better diagnostic data.

A more advanced solution leverages HTML technology in order to present more helpful information using a wider range of graphical capabilities; color, sound, images, etc. For infrared embodiments, the microcontroller 234 manages the NV memory 236 in addition to the IR medium. The NV memory 236 is sized appropriately to hold all necessary information for comprehensive web page content. For example, memory sizes of 64K, 128K, or larger are feasible. Software applications 301 on the operating system of the server computer 200 or, in the alternative, an embedded management processor, populates the NV memory 236 with the desired information. The bandwidth for populating the NV memory 236 is minimal.

In one embodiment, the microcontroller 234 is passive until interrogated by the handheld device 123. The handheld device 123 uses either a custom application to allow for easy roaming capabilities, or leverages already present TCP over PPP capabilities. TCP over PPP reduces the software work required. TCP over PPP may be implemented to provide the easy roam-in, roam-out usability as desired. In the first case, a custom application transfer HTML files from the server computer 200 to the handheld device 123, which includes appropriate web browser software that is used to browse the files. In the latter case, the PPP connection is used to directly browse the files on the server computer 200.

It is noted that capabilities currently exist to allow keyboard, mouse, and video information to be presented over the infrared medium or the serial port to suitable portable devices. As understood by those of ordinary skill in the art, this currently requires a host operating system and special software such as Windows 2000 or PC Anywhere. The bandwidth requirements may exceed current infrared limits. The bandwidth may be increased with compression or management techniques. For full rack configuration with headless operation, infrared technology is used to completely eliminate the cabling problems that exist with the use of a keyboard, mouse, and monitor.

It is appreciated that many operational modes are possible and contemplated for various usage model embodiments. For example, in an asset management configuration, the administrator 126 walks up to the rack 111 of the enabled server computers 101–109 and points the handheld device 123 (for infrared embodiments) or couples the handheld device 123 (for serial port embodiments). Communication is automatically commenced according to embodiments described, and the administrator 126 is provided with an indication that information has been gathered within the handheld device 123. For example, the handheld device 123 may assert a beep sound or the like. The handheld device 123 may further be configured to display the name of the server computer or device about which the information pertains. The administrator 126 can then later review all information at their convenience on the handheld device 123 or upload to a workstation for viewing the information, such as statistics or the like.

Figure 4:
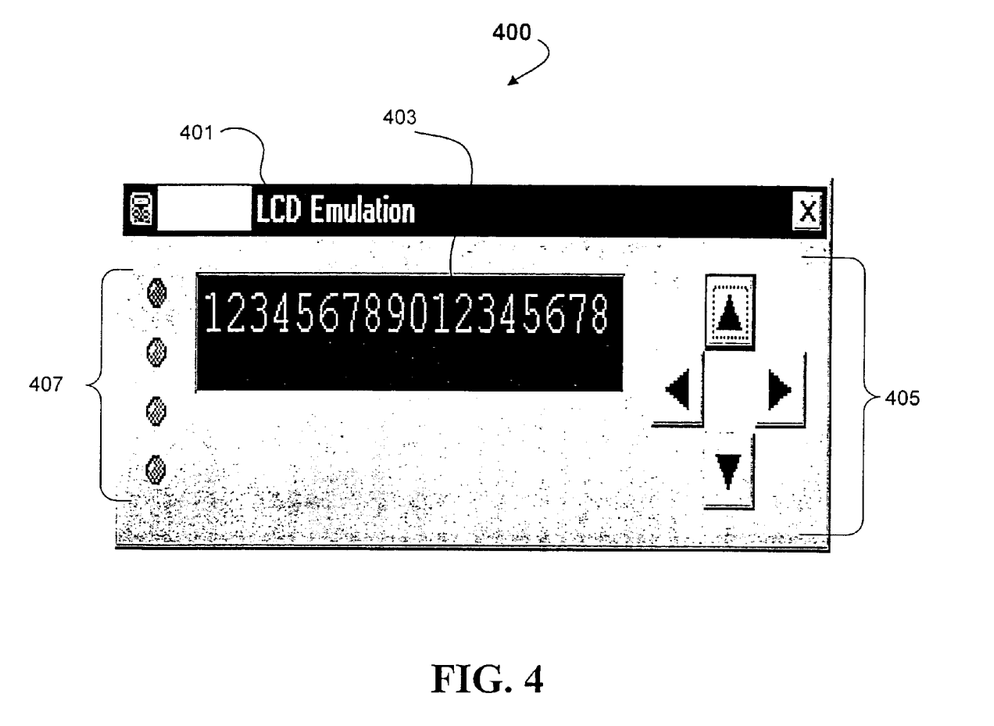
FIG. 4 is an exemplary screen shot of an LCD emulation embodiment.

FIG. 4 is an exemplary screen shot 400 of an LCD emulation embodiment, where the screen shot 400 is displayed on the display 124 of the handheld device 123. A window 401 or the like is shown and includes a virtual LCD display 403, one or more virtual buttons 405, one or more virtual LEDs 407, etc. The window 401 is in any desired format, such as a Windows CE version. The administrator 126 interfaces with the window 401 in standard fashion, such as with a pen stylus and/or cursor or the like, to interface the virtual buttons 405. The virtual LCD display 403 and virtual LEDs 407 display requested information in a similar manner as a physical LCD or IMD. However, the physical LCD or IMD is not necessary and is replaced by the handheld device 123. In an exemplary embodiment, the administrator 126 points the handheld device 123 to the rack 111 of enabled server computers 101–109, or serially couples the handheld device 123 to a selected server. A virtual alert LED 407 is used to indicate important information. A list of the servers is presented on the virtual LCD display 403 shown on the display 124, such as Windows MFC control. The administrator 126 selects a desired server, and the window 401 is displayed on the handheld device 123 and updated continuously just like a physical LCD.

Figure 5:
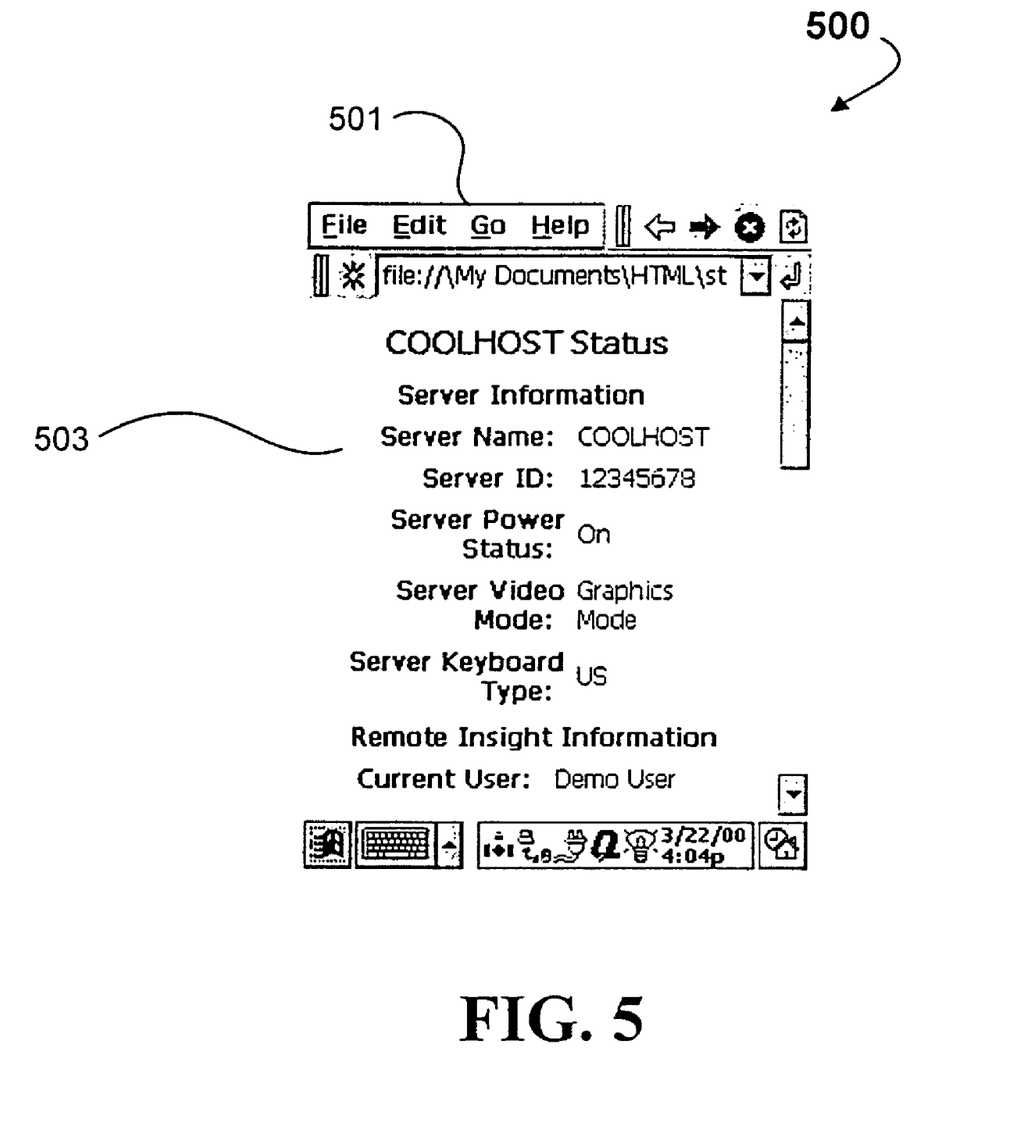
FIG. 5 is an exemplary screen shot of a web page embodiment for purposes of displaying management information.

FIG. 5 is an exemplary screen shot 500 of a web page embodiment for purposes of displaying management information, where the screen shot 500 is displayed on the display 124 of the handheld device 123. In this case, the handheld device 123 includes a browser or the like that displays an exemplary window 501 according to CIM/XE style pages. The window 501 includes standard window graphics and icons or the like, such as menus, slide bars, interface icons, etc., and includes an information area 503. Again, the administrator 126 points (or serially couples) the handheld device 123 to the rack 11 of enabled server computers 101–109. A list of the servers (not shown) is presented in information area 503 of the window 501. The administrator 126 selects a desired server or device, and the window 501 displays status information of the selected device. As shown, status information of a server named "COOLHOST" is displayed.

Figure 6:
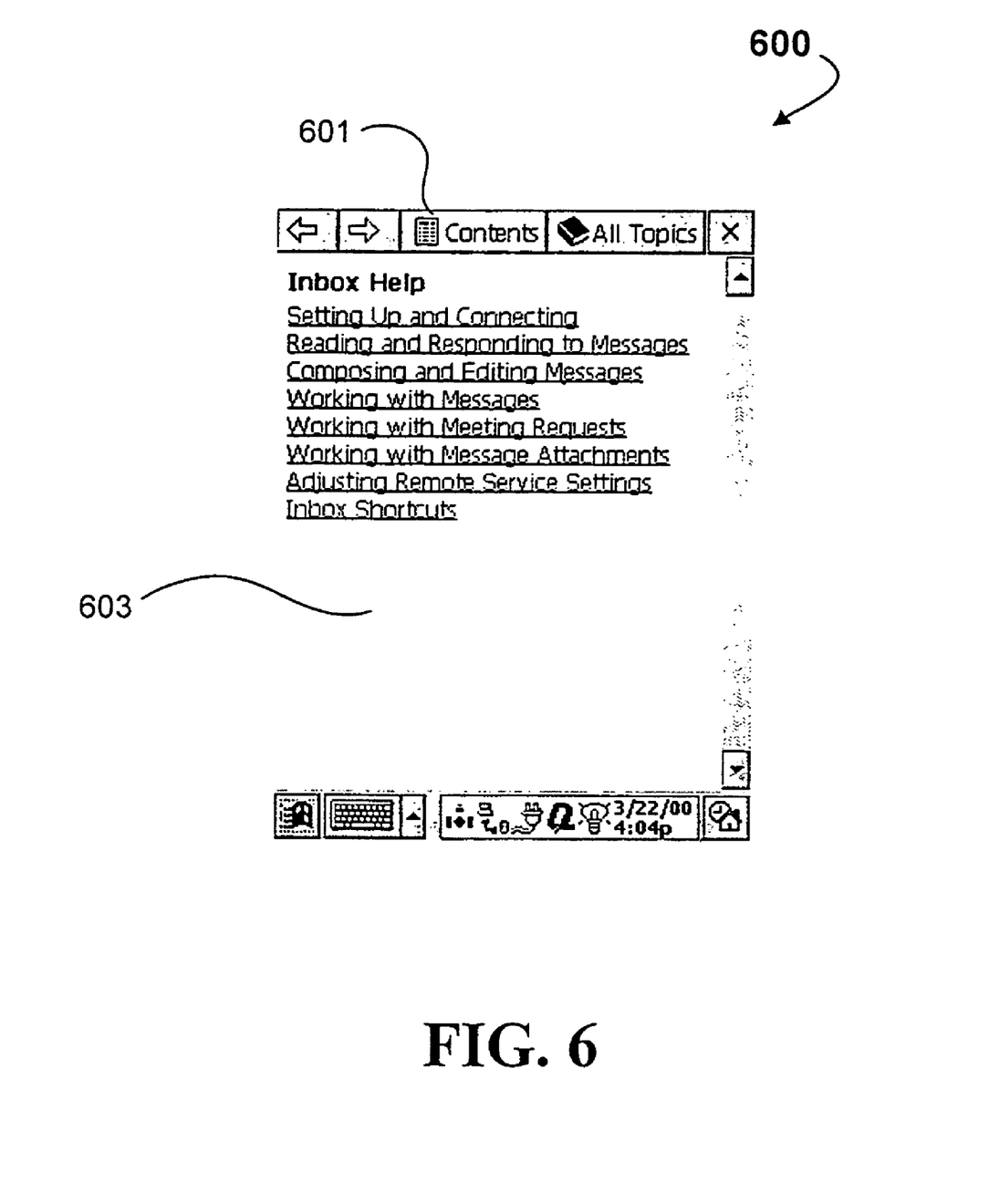
FIG. 6 is an exemplary screen shot of a web page embodiment for purposes of displaying diagnostic information.

FIG. 6 is an exemplary screen shot 600 of a web page embodiment for purposes of displaying diagnostics information, where the screen shot 600 is displayed on the display 124 of the handheld device 123. In this case, the handheld device 123 includes a browser or the like that displays an exemplary window 601 according to Xerox style information images or pages. The window 601 includes window graphics and icons or the like, such as menus, slide bars, interface icons, etc., and includes an information area 603. Again, the administrator 126 points (or serially couples) the handheld device 123 to the rack 111 of enabled server computers 101–109. A list of the servers in a failed or degraded state (not shown) are presented in the information area 603 of the window 601. An application operating on the handheld device 123 determines the source of the problem or error, such as failure of a fan or the like. As shown, Xerox style help information is displayed in the information area 603 of the window 601 providing a list of menu items for service and repair instructions.

Figure 7:
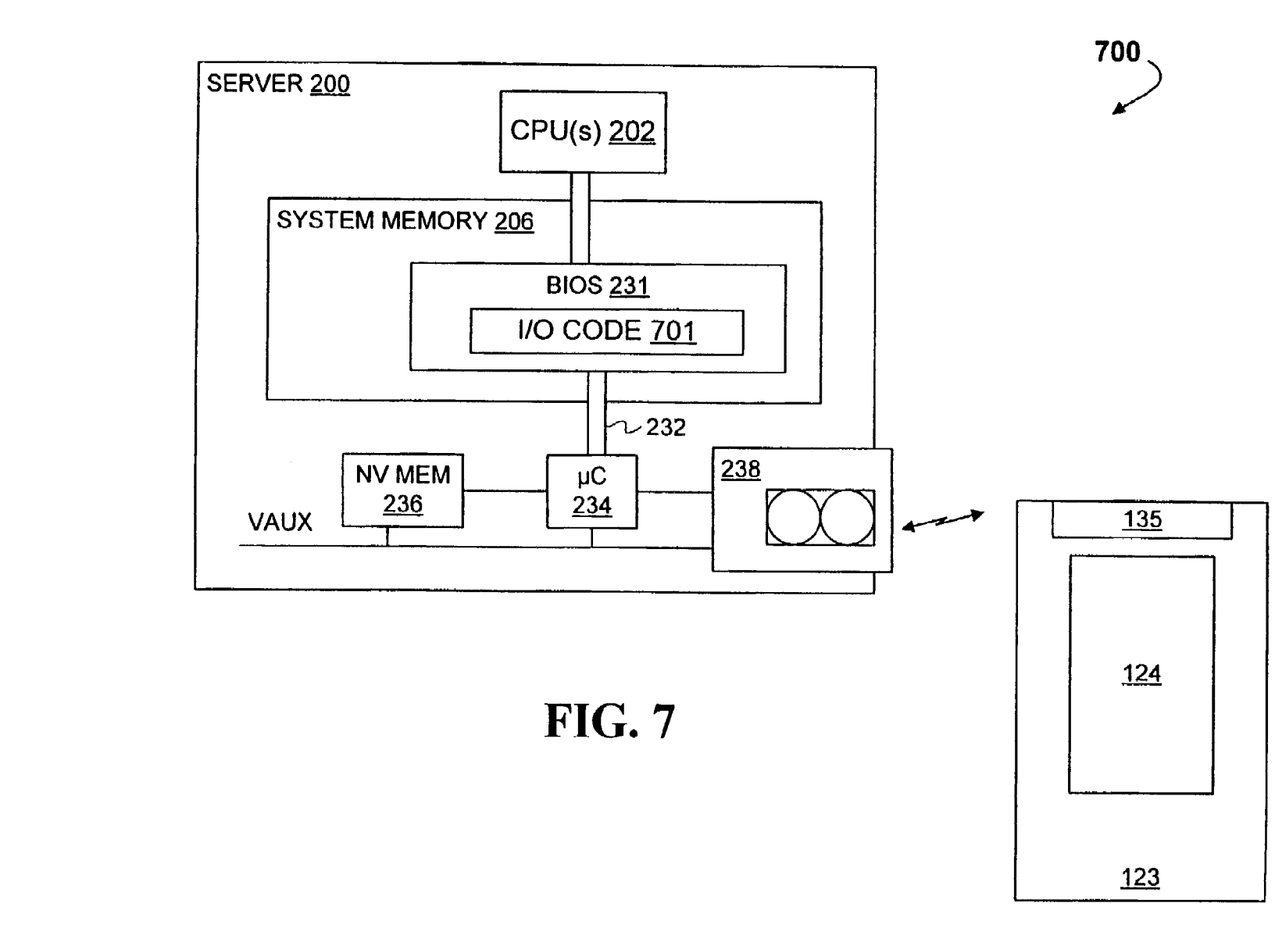
FIG. 7 is a simplified block diagram of the server computer of FIG. 2 illustrating another exemplary communication interface system implemented according to an infrared transceiver embodiment configured through the system ROM.

FIG. 7 is a simplified block diagram of the server computer 200 illustrating an exemplary communication interface system 700 implemented according to an infrared transceiver embodiment configured through the system ROM 229. In this embodiment, the BIOS 231 is loaded into the system memory 206 and executed by the CPU 202 during power up of the server computer 200. The BIOS 231 includes I/O code 701 that interfaces with the microcontroller 234 to enable I/O functions via the handheld device 123. In particular, the I/O code 701 includes code to enable the handheld device 123 to perform any one or more of keyboard functions, mouse functions, video functions, disk drive functions, etc. For video functions, for example, whatever information that would normally be displayed by a monitor coupled to the server computer 200 is instead displayed on the display 124. The administrator 126 is further able to run a SETUP routine to retrieve and modify setup, status and/or configuration information via the handheld device 123. The handheld device 123 may further be utilized to execute any diagnostic routines stored on the handheld device 123 or otherwise stored on any storage device of the server computer 200. For example, the handheld device 123, through operation of the I/O code 701, is configured to emulate a floppy disk drive for the server computer 200, such as drive A:, which further stores a diagnostic routine that is loaded into the system memory 206 and executed by the server computer 200.

In this manner, it is appreciated that the handheld device 123 emulates or otherwise replaces any one or more of the standard I/O functions of the server computer 200. This is particularly advantageous in a headless configuration in which the server computer 200 does not otherwise include a keyboard, a mouse, a monitor, a floppy drive, etc. The administrator 126 is thus able to control the server computer 200 at power up including functions such as setup, configuration, diagnostics, etc. It is further noted that auxiliary power through the VAUX power signal may optionally be provided to the NV memory 236, the microcontroller 234 and the infrared transceiver 238 in a similar manner as described previously. The handheld device 123 may include an updated ROM pack to update the system ROM 229 of the server computer 200. For example, the administrator 126, via the handheld device 123, runs the SETUP or configuration while booting the server computer 200, and then instructs the server computer 200 to replace the ROM code with that supplied by the handheld device 123.

Figure 8:
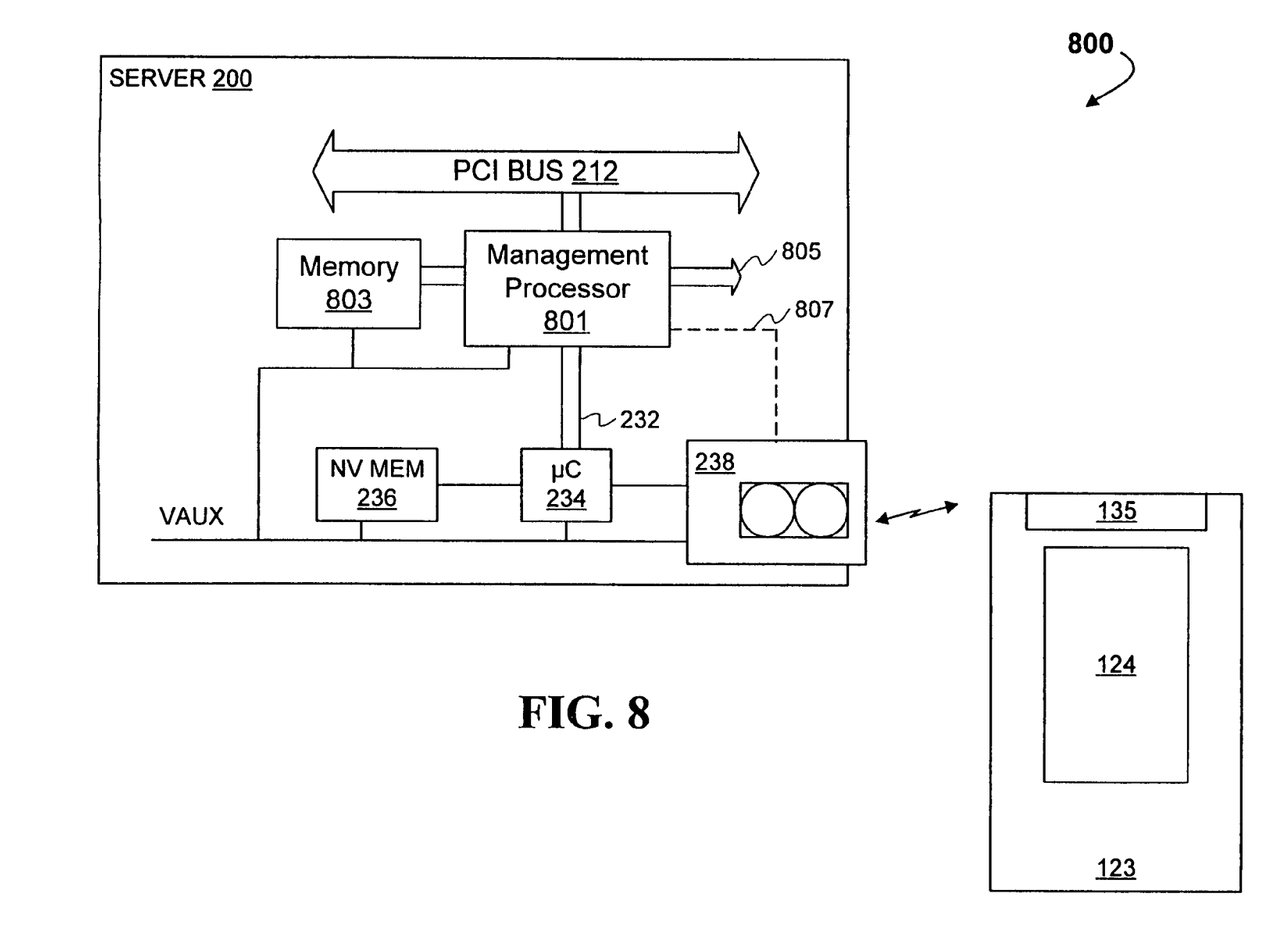
FIG. 8 is a simplified block diagram of the server computer of FIG. 2 illustrating yet another exemplary communication interface system implemented according to another infrared transceiver embodiment including a separate management processor.

FIG. 8 is a simplified block diagram of the server computer 200 illustrating another communication interface system 800 implemented according to another infrared transceiver embodiment including a separate management processor. In this embodiment, the management functions system 230 includes, or is otherwise replaced by, a management processor 801 coupled to the PCI bus 212. Thus, the management processor 801 is able to communicate with the host operating system and/or the system ROM. The microcontroller 234 is coupled to the management processor 801 via the I/O bus 232. The management processor 801 may further include its own memory system 803, which further includes any desired combination of RAM and ROM devices. The management processor 801 may further include separate communications to other bus systems (not shown) and may further incorporate or otherwise interface other I/O functions, such as one or more USBs (Universal Serial Buses), serial ports, a keyboard controller, a mouse interface, Ethernet, messaging interfaces abstracted on top of the PCI bus 212, etc. The management processor 801 may further be used to update the system ROM 229 of the server computer 200 by enabling the administrator 126 to execute the SETUP or configuration routine in a similar manner as described above.

The VAUX auxiliary power signal may optionally be provided to the management processor 801, the memory system 803, the NV memory 236, the microcontroller 234 and the infrared transceiver 238 in a similar manner as described previously. The microcontroller 234 implements the IrDA protocol and enables the functionality of the IrDA stack. Alternatively, the IrDA protocol and stack are implemented by the management processor 801, in which case the microcontroller 234 and NV memory 236 are not necessary, so that the infrared transceiver 238 is coupled directly to the management processor 801 as indicated by dashed line 807.

The communication interface system 800 operates in a similar manner as the interface system 700. The system ROM 229 need not include the I/O code 701 as the handheld device 123 is enabled via the management processor 801. In particular, the management processor 801 enables the handheld device 123 to perform any one or more of keyboard functions, mouse functions, video functions, disk drive functions, etc. In one embodiment, the management processor 801 decodes video cycles on the PCI bus 212 and converts to a video stream for display by the handheld device 123. In this manner, whatever information that would normally be displayed by a monitor coupled to the server computer 200 is instead displayed on the display 124. The administrator 126 is further able to run the SETUP routine to retrieve and modify setup, status and/or configuration information via the handheld device 123. The handheld device 123 may further be utilized to execute any diagnostic routines stored on the handheld device 123 or otherwise stored on any storage device of the server computer 200. For example, the handheld device 123, through operation of the management processor 801, is configured to emulate a floppy disk drive for the server computer 200, such as drive A:, which further stores a diagnostic routine that is loaded into the system memory 206 and executed by the server computer 200.

The management processor 801 provides additional functionality that may not be provided by the interface system 700. The management processor 801 may be separately booted from its own memory system 803 and effectively operate independently of the host server computer 200. If auxiliary power is provided, then the management processor 801 may be operational during boot up of host server computer 200, when the host server computer 200 shuts down, and while the server computer 200 remains powered down. In this manner, the management processor 801 may be used to track the health of the server computer 200 during normal operation, and may further store any status or statistical information that may have lead up to a premature shutdown. The management processor 801 may further track and store any additional status or statistical information after the server computer 200 is shut down. It is noted that some of this information stored in the memory system 803 may be associated with the operating system of the server computer 200, and that other information independent of the operation system may further be tracked and stored in the memory system 803. The administrator 126 may then use the handheld device 123 to access and retrieve all of the information stored in the memory system 803.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system comprising:
a CPU;
a peripheral bus coupled to the CPU;
a management processor coupled to the peripheral bus; and
an infrared transceiver coupled to the management processor;
the management processor enabling a handheld device to emulate any one or more of a keyboard, a mouse, a disk drive, and a monitor via the infrared transceiver,
the management processor to cooperate with the handheld device to load diagnostic software from the handheld device into the system for execution on the CPU to perform a diagnostic task.

2. The system of claim 1, further comprising:
the management processor decoding video cycles on the peripheral bus, converting the video cycles to a video stream and sending the video stream via the infrared transceiver for display by the handheld device.

3. The system of claim 1, further comprising:
a memory coupled to the management processor; and
the management processor storing status information of the system into the memory.

4. The system of claim 1, further comprising:
the management processor implementing an IrDA stack.

5. The system of claim 1, further comprising:
an I/O bus coupled to the management processor; and
a microcontroller coupled to the I/O bus and the infrared transceiver;
the microcontroller implementing an IrDA stack and enabling communications with the handheld device via the infrared transceiver.

6. The system of claim 1, further comprising:
a first memory coupled to the management processor;
an I/O bus coupled to the management processor;
a microcontroller coupled to the I/O bus and the infrared transceiver; and
a second memory coupled to the microcontroller.

7. The system of claim 6, further comprising an auxiliary power source;
the management processor, the first and second memories, the microcontroller and the infrared transceiver coupled to the auxiliary power source.

8. A system comprising:
an interface to communicate with a personal digital assistant (PDA) device; and
a processor to interact with the PDA device through the interface to enable the PDA device to emulate a pointer device function and a display function of the system, wherein the processor is adapted to load diagnostic software from the PDA device into the system for execution to perform a diagnostic task.

9. The system of claim 8, wherein the system comprises a headless system that does not have a pointer device and a display.

10. The system of claim 8, wherein the interface comprises an infrared transceiver.

11. The system of claim 8, wherein the processor is adapted to interact with the PDA device through the interface to further emulate a keyboard function.

12. The system of claim 8, further comprising a system bus over which video cycles are routed, wherein the processor is adapted to convert the video cycles to video data and to send the video data through the interface to the PDA device for display by the PDA device.

13. The system of claim 8, wherein the processor is adapted to interact with the PDA device through the interface to further emulate a disk drive.

14. The system of claim 13, wherein the processor is adapted to load the diagnostic software into the system from the PDA device in the PDA device's role of emulating a disk drive.

15. The system of claim 14, wherein the processor is adapted to receive control commands through the interface from the PDA device during initialization of the system.

16. A method executable in a system, comprising:
communicating with a handheld device through an infrared interface;
interacting with the handheld device through the infrared interface to enable the handheld device to emulate a pointer device function and a display function of the system; and
loading diagnostic software from the infrared handheld device into the system to perform a diagnostic task.

17. The method of claim 16, wherein emulating the pointer device function and the display function of the system comprises emulating the pointer device function and the display function of a headless system that does not have a pointer device and a display.

18. The method of claim 16, further comprising interacting with the handheld device through the infrared interface to further emulate a keyboard function.

19. The method of claim 16, wherein the system comprises a system bus over which video cycles are routed, the method further comprising converting the video cycles to video data and to send the video data through the infrared interface to the handheld device for display by the handheld device.

20. The method of claim 16, further comprising interacting with the handheld device through the infrared interface to further emulate a disk drive.

21. The method of claim 20, wherein loading the diagnostic software into the system from the handheld device is based on the handheld devicets role of emulating a disk drive.

22. The system of claim 1, wherein the handheld device comprises a personal digital assistant (PDA) device, and the management processor to cooperate with the PDA device to load the diagnostic software from the PDA device into the system.

23. The method of claim 16, wherein loading the diagnostic software from the handheld device into the system comprises loading the diagnostic software from a personal digital assistant (PDA) device into the system.

* * * * *

UNITED STATES PATENT AND TRADEMARK OFFICE
CERTIFICATE OF CORRECTION

| | | |
|---|---|---|
| PATENT NO. | : 7,082,528 B2 | Page 1 of 1 |
| APPLICATION NO. | : 10/682348 | |
| DATED | : July 25, 2006 | |
| INVENTOR(S) | : Stephen M. Zaudtke et al. | |

It is certified that error appears in the above-identified patent and that said Letters Patent is hereby corrected as shown below:

On the Title Page, Item (63), under "Related U.S. Application Data", line 1, delete "Continuation" and insert -- Divisional --, therefor.

In column 7, line 60, delete "101-169" and insert -- 101-109 --, therefor.

In column 14, line 48, delete "11" and insert -- 111 --, therefor.

In column 18, line 53, in Claim 21, delete "devicets" and insert -- device's --, therefor.

Signed and Sealed this

Twenty-eighth Day of July, 2009

JOHN DOLL
*Acting Director of the United States Patent and Trademark Office*